United States Patent [19]

Wagner et al.

[11] Patent Number: 4,850,838
[45] Date of Patent: Jul. 25, 1989

[54] APPARATUS FOR PRODUCING A COATING ON A LAMINAR CARRIER MEMBER

[75] Inventors: Werner Wagner, Bad Nenndorf; Philipp Schaefer, Hanover; Horst Büscher, Langenhagen, all of Fed. Rep. of Germany

[73] Assignee: J. H. Benecke Aktiengesellschaft, Hanover, Fed. Rep. of Germany

[21] Appl. No.: 205,504

[22] Filed: Jun. 3, 1988

Related U.S. Application Data

[63] Continuation of Ser. No. 945,337, Dec. 22, 1986, abandoned.

[30] Foreign Application Priority Data

Dec. 20, 1985 [DE] Fed. Rep. of Germany ....... 3545399

[51] Int. Cl.$^4$ .............................................. B29C 23/00
[52] U.S. Cl. .................................. 425/101; 425/174.4; 425/174.8 R; 425/115; 425/122
[58] Field of Search ...................... 425/101, 174, 174.4, 425/174.8 R, 174.8 E, 110, 115, 122

[56] References Cited

U.S. PATENT DOCUMENTS

| 3,973,887 | 8/1976 | Breckenfelder | 425/101 |
| 4,292,016 | 9/1981 | Elliott | 425/101 |
| 4,537,733 | 8/1985 | Farago | 425/174.8 E X |
| 4,563,395 | 1/1986 | Gillner et al. | 425/101 X |
| 4,587,066 | 5/1986 | Rodriguez | 425/174.4 X |

Primary Examiner—Charles Hart
Attorney, Agent, or Firm—Herbert Dubno

[57] ABSTRACT

An apparatus for producing a coating on a laminar carrier member, in particular for dressing split leather or similar substrates, comprises a supporting base having a surface consisting of silicon rubber or silicone resin, onto which surface is applied a liquid coating material by means of an electrostatic spraying device arranged above the supporting base for the purpose of producing a foil forming the visible side of the coating after solidification of the coating material. The surface of the supporting base is preferably provided with an embossed pattern, for example with the grain structure of natural leather. For the purpose of improving the adhesion of the foil, formed by solidification of the liquid coating material, on the supporting base, the surface of this supporting base is provided with a microscopic roughness. Alternatively, the area of the supporting base adjacent the aforesaid surface is made electrically conductive and held at a predetermined electrical potential. Microscopic roughness can be obtained by embedding filler materials within the area of the surface of the supporting base. Microscopic roughness can, also be obtained by mechanical, electrical, and/or chemical surface treatment.

43 Claims, 1 Drawing Sheet

APPARATUS FOR PRODUCING A COATING ON A LAMINAR CARRIER MEMBER

This is a continuation of co-pending application Ser. No. 945,337 filed on Dec. 22, 1986 and now abandoned.

BACKGROUND OF THE INVENTION

1. Field of the Invention

The invention refers to an apparatus for producing a coating on a laminar carrier member. The invention refers in particular to an apparatus for dressing leather, preferably split leather, or for dressing substrates being similar to split leather.

The term "substrate" is herein defined or comprising a tissue, a knitting or a fleece, which is manufactured from natural or synthetic fibres and which has, similar to split leather, at least on one side fibres protruding from the surface, i.e. has properties similar to that of split leather and can be used in place of split leather in the production of artificial leather. The split leather or substrate is, in such a case, provided with a thin coating formed of a thin foil and showing at its visible side the grain structure of natural leather, noting that the protruding fibres of the split leather or of the substrate become anchored within the foil forming the coating or, respectively, within the adhesive layer between the split leather or substrate, respectively, and the foil, so that there results an inseparable connection with this coating.

The foil forming the coating is produced by applying onto a supporting base comprising a surface consisting of silicone rubber or of silicone resin a liquid coating material which solidifies on the supporting base, which is preferably heated. The supporting base may consist of a plate member or of a belt, preferably of an endless circulated belt.

2. Description of the Prior Art

It is already known to improve the quality of the surface of split leather by applying thereon a film of synthetic plastics material. According to German Patent Specification No. 32 29 150, the procedure is, for example, such that a liquid coating material is applied onto a supporting base being provided with an embossed pattern having the appearance of the grain structure of natural leather and being heated to a temperature between 70° and 185° C. and is solidified there to a film showing the embossed pattern, onto which film is subsequently placed the split leather with interposition of an adhesive consisting, for example, of a polyurethane dispersion, noting that subsequently the split leather is compressed together with the film under the action of vacuum. The liquid coating material, which is applied onto the surface of the supporting base for forming the film, is, for example, an aqueous dispersion of synthetic plastics material, in particular a polyurethane dispersion. This procedure results in an excellent end product in which can be formed very thin foils as the dressing, noting that air inclusions within the dressing or between the dressing and the split leather are avoided and a visible surface of nice appearance can be obtained in spite of the different thickness at individual areas of the split leather.

Utilization of a supporting base of silicone rubber is particularly suitable in the production of the foil, because the surface of silicone rubber has a distinct mould releasing effect and anti-adhesive effect as well as strongly hydrophobic properties, so that the foil can easily be removed from the supporting base even if no mould release agent is used. It is in particular in case of a very thin foil, what is convenient for not impairing the desired leather-like properties by applying the foil, and in case of a supporting base showing on its surface a very fine embossed pattern resulting in a very fine grain on the visible side of the foil that there exists the risk that the solidified foil becomes removed in an undesired manner from the supporting base consisting of silicone rubber or is at least displaced on this supporting base, so that it becomes difficult or even impossible to apply thereon the split leather provided with the adhesive layer or folds are generated in the foil. It is in particular when forming the foil from a dispersion of synthetic plastics material that there exists a great risk that, on account of the hydrophobic properties of the silicone rubber, the foil is removed from the supporting base still prior to having contacted the split leather with the foil. Additionally it has to be considerated that for the purpose of rapidly solidifying the foil on the supporting base, blowers are used to heat this supporting base so that the solidified foil, particularly when it is very thin, is lifted off the base by the resultant draft.

OBJECTS OF THE INVENTION

It is an object of the invention to provide an apparatus for producing a coating on a laminar carrier member, the apparatus having a supporting base having a surface formed of silicone rubber or a silicone resin and serving for the formation of the coating by application of the coating to this surface and solidification of the coating on the surface. The supporting base should be designed such that the carrier member and the coating can be stripped from the supporting base without additional measures, such as application of a release agent to the supporting-base surface, while at the same time any unwanted release of the solidified foil from the supporting base is avoided. It is a further object of the invention to provide an apparatus in which the liquid coating material can be applied to the supporting base without substantial loss. A further object is to design an apparatus such that pearl formation of the coating is substantially suppressed and a uniform foil of uniform thickness is obtained when an aqueous dispersion of a synthetic resin is applied to the supporting base which has a surface formed of silicone rubber or a silicone resin.

SUMMARY OF THE INVENTION

The foregoing objects have been achieved through an apparatus for producing a coating on a laminar carrier member which comprises:

a supporting base in the form of an endless belt, said supporting base having a surface comprising a silicone, and wherein said surface has a microscopic roughness;

means for applying a liquid coating onto said supporting base, said liquid coating forming a foil upon solidification; and means for placing said carrier member onto said foil.

Thus, a key aspect of the invention is the presence of microscopic roughness on a surface of the supporting base. Microscopic roughness of the surface can be obtained by embedding filler materials into the surface. Appropriate filler may include powdered leather, wood, wool, cellulose, pulverulent plastics, graphite, carbon black and aluminum powder.

In a second embodiment, a controlled release of the solidified foil from the supporting base can be achieved by providing the surface of the base with an electrically conductive composition and maintaining the surface at a predetermined electrical potential. Electrical conductivity may be imparted by use of graphite, carbon black or aluminum powder filler into the silicone rubber surface of the support base.

BRIEF DESCRIPTION OF THE DRAWINGS

The apparatus according to the invention is shown in the annexed drawings.

DETAILED DESCRIPTION OF THE PREFERRED EMBODIMENT

The apparatus according to the invention has a supporting base 1 which is formed of an endless belt 2 running over rollers 3', 3''. Above the belt, there is arranged an electrostatic spraying device 4 of known construction by means of which a liquid coating material is sprayed onto the supporting base. Heating means 5, for example heat radiators, are arranged below the supporting base for heating the supporting base, so that a rapid solidification of the coating material takes place for forming the foil from the coating material having been sprayed by means of the spraying device 4.

Suitable coating materials for dressing split leather or fleeces are primarily dispersions and/or solutions of synthetic plastics materials or elastomers, respectively. However, especially for other purposes, there can also be used other material such as varnishes or paints, i.e. all those products which could also up till now be applied onto a supporting base by means of electrostatic spraying devices.

Figure 2:
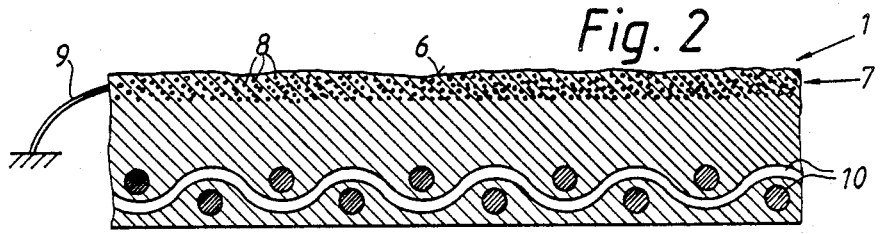
FIGS. 2 through 5 show in an enlarged scale a portion of the supporting base in a cross section.

In the most simple case, the supporting base 1 consists as a whole of silicone rubber, noting that the surface 6 receiving the liquid coating material shows an embossed pattern corresponding in structure to the grain of natural leather and giving the produced foil a leatherlike appearance and shows a microscopic roughness. This microscopic roughness can, in the most simple case, be obtained by merely correspondingly treating the surface 6 by mechanical, physical, electrical and/or chemical means. The microscopic roughness can, however, also be obtained by embedding corresponding filler material 8 at least within the layer 7 located adjacent the surface 6, as is shown in FIG. 2. It is convenient if the surface 6 is correspondingly treated and if also filler materials 8 are incorporated into the layer 7 located adjacent said surface. In the embodiment according to FIG. 2, these filler materials may consist of organic dust-like substances such as, for example, leather flour, wood flour, wool flour, cellulose flour, flour of synthetic plastics material, graphite or carbon black, but may also consist of metal powder, for example of aluminum powder.

These filler materials must consist of a material, the properties of which do not change when being mixed with the silicone rubber or silicone resin and which result in a glueing effect or adhering effect, respectively. The filler materials in question are thus additional filler materials beside the filler materials, such as, for example, silicates or clay powder, present in the silicone rubber or the silicone resin and not contributing a glueing effect or adhesive effect, respectively.

When using as the filler material powdered synthetic plastics material, it is necessary to use a synthetic plastics material which is neither extracted by becoming dissolved nor destroyed when heating the supporting base to a temperature of approximately 120° C. as is the case when operating the apparatus according to the invention. The synthetic plastics material used must also not become pronouncedly plastic when being heated to the mentioned temperature, because otherwise the supporting base becomes softer and the imprints of the leather on the supporting base remain visible. This effect is encountered in those cases in which the whole supporting base contain a powdered thermoplastic synthetic material, such as for example PVA, in an amount of more than 12 percent by volume.

The filler materials 8 may, however, also consist of hollow microspheres. Conveniently, there are used such hollow microspheres, the thin shell of which is formed of a vinylidene chloride copolymer or of a phenolic resin and the interior of which contains a gas. Furthermore, the filler materials may consist of solid materials which sublime into the gaseous phase and thereby provide the microscopic roughness. Particularly suitable filler materials 8 are filler materials having maximum dimensions between 0.0001 and 0.1 mm. The arrangement of these filler materials 8 solely within the layers 7 located adjacent the surface 6 of the supporting base 1 results in the desired microscopic roughness of this surface 6. It is convenient, if the filler materials 8 are arranged at least within the layer 7 located adjacent the surface 6 in an amount within the range of 1 to 40 percent by volume.

If the microscopic roughness is obtained by embedding filler materials within the area located adjacent the surface of the supporting base, this microscopic roughness can already be discerned at a magnification of at least 500.

If the surface 6 of the supporting base 1 is subjected to a mechanical and/or physical surface treatment or an electric and/or chemical surface treatment, respectively, this results in a modification of the surface 6 of the supporting base 1 and thus in a microscopic roughness. It is of particular advantage to embed filler materials 8 into the supporting base 1 at least within the area of its surface 6 as well as to perform a surface treatment. In case of a mechanical and/or chemical surface treatment, the filler materials 8 being embedded into the material of the supporting base 1 are partially exposed, so that the required roughness of the surface is more strongly pronounced. If, for example, the mentioned hollow microspheres are used as filler materials 8, at least some of these hollow microspheres arranged immediately adjacent said surface are destroyed or opened, respectively, by a mechanical treatment, for example by grinding or compressing, or by a chemical surface treatment, so that the surface of the supporting base becomes rougher.

If the surface 6 of the supporting base 1 is subjected to a mechanical surface treatment, this surface can, for example, be provided with a microperforation.

The surface 6 of the supporting base 1 can, however, also be flamed, for example by means of a gas flame. This results in the formation of, so to say, radicals in the surface, i.e. the molecule chain of the substance forming the supporting base 1 is cracked, which results in an adhesion in a chemical-physical manner. If there is flamed a surface 6, having embedded therein filler materials 8, of the supporting base 1, this also results in opening this surface 6 by partially burning or carbonizing the filler materials, which equally results in a microscopic roughness of this surface 6. Similar results are, when simultaneously using filler materials 8, obtained if the surface 6 of the supporting base 1 is treated by an electric spark discharge (corona discharge). When simultaneously using organic filler materials 8 within the area located adjacent the surface of the supporting base, there results a microscopic roughness, which can be discerned at a magnification of at least 1000.

Furthermore, the surface 6 of the supporting base 1 can, for example, be irradiated by Laser beams or, respectively, be treated with a solvent, for example dimethylformamide or benzene. By chemically or electrochemically treating the surface of the supporting base, there results a modification of the material, which can, in the broadest sense, be considered as a type of corrosion and which is characterized by tiny craters on the surface, whereby the desired microscopic roughness of the surface 6 is obtained.

If the microscopic roughness of the surface of the supporting base is only obtained by a physical or, respectively, an electrical or electrochemical treatment, i.e. by flaming or by a Laser beam treatment, for example, the microscopic roughness can, as a rule, only be discerned at a magnification of at least 1500. But also in this case, the adhesion of the foil, having been formed on the supporting base, can be improved by at least 20 percent.

Figure 3:
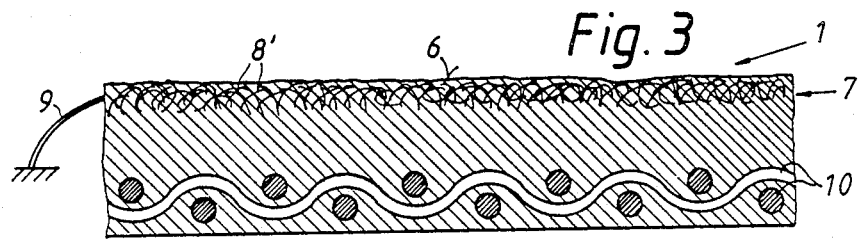

FIG. 3 shows an embodiment in which carbon fibres or metal fibres 8' are embedded within the layer 7 located adjacent the surface 6 of the supporting base 1. Also in this manner, the desired microscope roughness of the surface 6 is obtained.

A further possibility to increase the adhesive properties of the surface 6 of the supporting base 1 consists in making electrically conductive at least the layer 7 located adjacent the surface 6 of the supporting base 1 and in maintaining this layer at a predetermined potential, preferably at zero potential. On account of this arrangement, the coating material is, in particular when having applied the coating material by means of the electrostatic spraying device, attracted by the supporting base, so that only minor spraying losses are encountered when applying the coating material and the foil formed therefrom adheres to the supporting base 1 in the desired manner. Thereby the supporting base is, together with the foil located thereon, capable of following all movements when producing the dressed split leather without running the risk that the foil becomes lifted off the supporting base 1. It is even possible to swivel the supporting base or even to turn its upside down without the risk of the foil becoming lifted off the supporting base, and this also if aqueous dispersions or emulsions are used as coating material.

Of course, it is possible to make the surface 6 of the supporting base 1 microscopically rough as well as to make electrically conductive the layer 7 located adjacent said surface 6. For the purpose of obtaining this electrical conductivity of the layer 7, there can be partially used the same filler materials as are used for obtaining the microscopic roughness of the surface 6. Thus, the layer 7 becomes, for example, conductive if the filler materials 8 consist of graphite, carbon black or metal powder, for example aluminum powder, and if, respectively, the filler materials 8' consist of metal fibres or carbon fibres.

Electrical conductivity can, however, also be obtained when using as filler material suitable liquid or pasty substances such as, for example, polyglycol ethers of high molecular weight.

The filler materials can further consist of waterattracting substances which are added to the silicone resin being capable of being cured in the cold, said substances being formed, for example, of sodium chloride or of polyglycols. These filler materials equally provoke, at least partially, a microscopic roughness of the surface 6 of the supporting base 1 and reduce, primarily, the hydrophobic properties of the surface 6 of the silicone rubber or silicone resin. Thereby when using as the coating material aqueous dispersions of synthetic plastics material, as is advantageous in consideration of environmental protection, the surface tension on the surface 6 of the supporting base 1 is reduced. Thus the undesired pearl formation during applying the coating material onto the supporting base 1 is suppressed.

As already mentioned, the electrically conductive layer 7 must be kept at a predetermined potential, conveniently at zero potential and thus be put to ground. For this purpose, it is necessary to have an electrical conductor 9 extending out of the electrically conductive layer 7 and to ground this conductor as shown in the FIGS. 2 to 4.

Conveniently, the supporting base 1 is provided with a reinforcing insert 10. This reinforcing insert 10 may consist of a fleece or of a tissue, preferably of a glass fibre fleece or a glass fibre tissue, but also of metal wires, for example aluminum wires, and/or carbon fibres. When using wires or fibres, respectively, these wires or fibres are conveniently arranged like a lattice.

Figure 4:
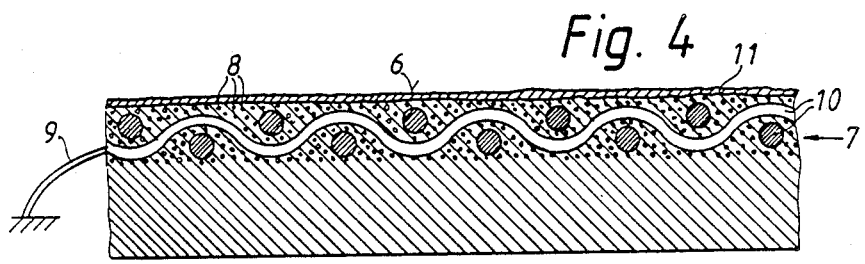

The use of metal wires or, respectively, carbon fibres for the reinforcing insert 10 results, when arranging this reinforcing insert 10 within the electrically conductive layer 7 in the manner shown in FIG. 4, in the advantage that this reinforcing insert consisting of electrically conductive material can simultaneously be used for grounding this layer.

If electrical conductivity is obtained by adding staining filling materials, such as for example carbon black or graphite, there exists, in case of a high concentration of these filler materials at the surface, the risk of the applied liquid coating material becoming stained by these filler materials, so that the foil formed of the coating material has not the desired tinge. For avoiding such staining, it is therefore convenient if the surface 6 has a lower electrical conductivity, i.e. a lower content in filler materials 8 resulting in said electrical conductivity. For this purpose, the supporting base 1 is, as can be taken from FIG. 4, provided with a thin cover layer 11 showing said smaller electrical conductivity. In this manner, any change in color of the applied coating material is suppressed.

Figure 1:
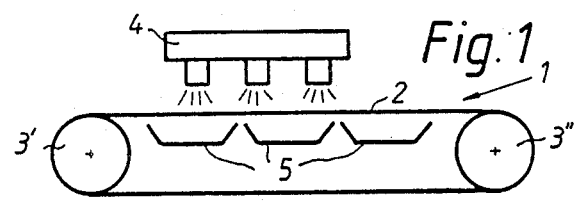
FIG. 1 shows schematically the construction of the apparatus according to the invention.
Figure 5:
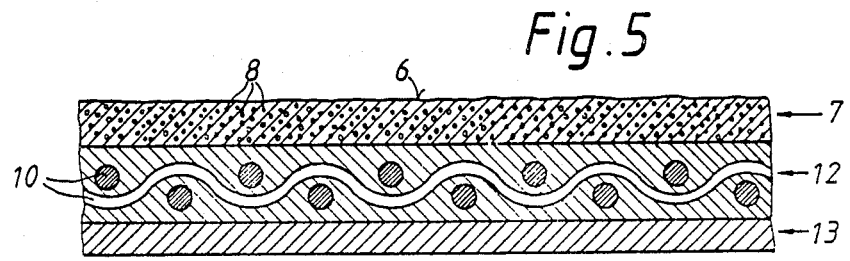

As already mentioned, the supporting base 1 can be formed as a single part consisting of silicone rubber or silicone resin, noting that this supporting base 1 can, as a whole, be provided with filler materials 8 or can have arranged these filler materials only within the layer 7 located adjacent the surface 6. It is, however, also possible to make the supporting base 1 out of several layers 7, 12, 13 consisting of different materials, i.e. to make only the layer 7 of silicone rubber or silicone resin and to provide this layer with filler materials 8 as is shown in FIG. 5. A reinforcing insert 10 can then, for example, be arranged within the layer 12. It is, however, also possible to design, in place of such a reinforcing insert or in addition thereto, the lowermost layer 13 as a carrier or a reinforcement, respectively. This lowermost layer 13 can, in this case, consist, for example, of a carrier consisting of paper and optionally also having been made electrically conductive or of a thin metallic carrier, for example of aluminum sheet. The use of electrically conductive materials for the lowermost layer 13 of the supporting base 1 results in the advantage that, in case of this supporting base being designed as an endless belt in the manner illustrated in FIG. 1, grounding of the electrically conductive layer 7 can be effected via the lowermost electrically conductive layer 13 and via the rollers 3', 3" comprising a surface of electrically conductive material, for example metal.

The lowermost layer 13 is conveniently only partially connected, preferably by glueing, with the overlying layer 12, so that differing heat dilatations not result in separating the connection between the layers 12, 13.

The reinforcing insert 10 formed of metal wires or carbon threads can, for example in the embodiment according to FIG. 2, also be utilized as electrical resistance heating for heating the supporting base 1, in which case the heating means 5 can optionally be omitted.

The following test has been made: A usual supporting base of silicone rubber or silicone resin is subdivided. The surface of one portion remains untreated, whereas the surface of the other portion is treated by flaming with a gas flame. Subsequently, a dispersion of synthetic plastics material is applied to the surface of both portions. the applied dispersion of synthetic plastics material forms pearls immediately after the application of the dispersion onto the untreated surface, while the dispersion scarcely forms pearls on the portion treated by flaming. As a result the liquid film applied to the treated surface is converted to a solid film without additional measures, such as heating, whereas the non-treated portion does require additional measures. Adhesion of the solidified film on the treated portion is improved by more than 20 percent as compared with the adhesion of the solidified film on the non-treated portion.

What we claim is:

1. An apparatus for producing a coating on a laminar carrier member, the apparatus comprising:
    a supporting base having a surface and comprising at least at the surface of a silicone, said surface having a microscopic roughness;
    filler materials embedded at least within that area of the supporting base which is located adjacent the surface;
    means for applying a liquid coating to said surface of the supporting base, said liquid coating forming a foil upon solidification; and
    means for placing said carrier member onto said foil.

2. Apparatus as claimed in claim 1, wherein the filler materials consist of dust-like organic substances.

3. Apparatus as claimed in claim 1 wherein the filler materials consist of hollow microspheres.

4. Apparatus as claimed in claim 1 wherein the filler materials consist of solid substances which sublime into the gaseous phase and thereby form pores.

5. Apparatus as claimed in claim 1 wherein the filler materials have maximum dimensions between 0.000 and 0.1 mm.

6. Apparatus as claimed in claim 1 wherein the filler materials consist of water-attracting substances.

7. Apparatus as claimed in claim 1 wherein the filler materials are arranged in an amount between 1 to 40 percent by volume at least within that area of the supporting base, which is located adjacent the surface.

8. Apparatus as claimed in claim 1 wherein the surface of the supporting base has an embossed pattern in shape of the grain structure of natural leather, said structure being repeated at least once without disturbing transitions on a surface area of at least 1.2 m$^2$.

9. Apparatus as claimed in claim 1 wherein the supporting base is provided with a thin cover layer on an upper side of said base.

10. Apparatus as claimed in claim 1 wherein the supporting base consists of a plurality of layers extending in parallel relation to the surface and only an uppermost layer of said base consists of a material containing silicone, said filler materials being only arranged within the uppermost layer.

11. Apparatus as claimed in claim 10 wherein a lowermost layer of said base consists of a carrier of paper.

12. Apparatus as claimed in claim 1 wherein the supporting base is provided with reinforcing means.

13. Apparatus as claimed in claim 12 wherein the reinforcing means are embedded within the supporting base.

14. Apparatus as claimed in claim 12 wherein the reinforcing means form a lowermost layer of the supporting base and are at least locally connected with the layer located above.

15. Apparatus as claimed in claim 12 wherein the reinforcing means consist of a fleece or of a tissue.

16. Apparatus as claimed in claim 12 wherein the reinforcing means consist of metal wires.

17. Apparatus as claimed in claim 12 wherein the reinforcing means consist of carbon fibres.

18. Apparatus as claimed in claim 12 wherein the reinforcing means consist of a thin metallic carrier.

19. Apparatus as claimed in claim 1 wherein the means for applying the liquid coating material onto the surface of the supporting base comprises an electrostatic spraying device.

20. Apparatus as claimed in claim 19 wherein the supporting base is laterally movable below the electrostatic spraying device.

21. An apparatus for producing a coating on a laminar carrier member, the appratus comprising:
    a supporting base having a surface and formed at least at the surface of a silicone, an area of the supporting base adjacent the surface being electrically conductive;
    means for maintaining said area at a predetermined electrical potential;
    means for applying a liquid coating onto said supporting base at a potential different from that of the area, said liquid coating forming a foil upon solidification; and
    means for placing said carrier member onto said foil 22. Apparatus as claimed in claim 21 wherein filler materials are embedded within that area of the supporting base which is located adjacent the surface.

23. Apparatus as claimed in claim 22 wherein the filler materials consist of electrically conductive and dust-like organic substances such as, for example, graphite or carbon black.

24. Apparatus as claimed in claim 22 wherein the filler materials consist of metal powder.

25. Apparatus as claimed in claim 22 wherein the filler materials have maximum dimensions between 0.0001 and 0.1 mm.

26. Apparatus as claimed in claim 22 wherein the filler materials consist of carbon fibres.

27. Apparatus as claimed in claim 22 wherein the filler materials consist of metal threads.

28. Apparatus as claimed in claim 22 wherein the filler materials consist of liquid or gaseous substances providing electrical conductivity.

29. Apparatus as claimed in claim 22 wherein the filler materials are arranged in an amount between 1 to 40 percent by volume at least within that area of the supporting base, which is located adjacent the surface.

30. Apparatus as claimed in claim 21 wherein the surface of the supporting base has a lower electrical conductivity than an area below the surface.

31. Apparatus as claimed in claim 21 wherein supporting base is provided on top with a thin cover layer.

32. Apparatus as claimed in claim 21 wherein the supporting base consists of a plurality of layers extending in parallel relation to the surface and noting that only the uppermost layer is formed of a material containing silicone and the filler materials are only arranged within this uppermost layer.

33. Apparatus as claimed in claim 31 wherein a lowermost layer of said base consists of a carrier of paper.

34. Apparatus as claimed in claim 21 wherein the supporting base is provided with reinforcing means.

35. Apparatus as claimed in claim 34 wherein the reinforcing means are embedded within the supporting base.

36. Apparatus as claimed in claim 34 wherein the reinforcing means form a lowermost layer of the supporting base and is at least locally connected with a layer located there above.

37. Apparatus as claimed in claim 34 wherein the reinforcing means consist of a fleece or of a tissue.

38. Apparatus as claimed in claim 34 wherein the reinforcing means consist of metal wires.

39. Apparatus as claimed in claim 34 wherein the reinforcing means consist of carbon fibres.

40. Apparatus as claimed in claim 34 wherein the reinforcing means consist of a thin metallic carrier.

41. Apparatus as claimed in claim 21 wherein the means for applying the liquid coating material comprise an electrostatic spraying device.

42. Apparatus as claimed in claim 41 wherein the supporting base is laterally movable below the electrostatic spraying device.

43. Apparatus as claimed in claim 21 wherein the surface of the supporting base has an embossed pattern in the shape of a grain structure of natural leather, the shape of said structure being repeated at least once without disturbing transitions at the joints on a surface area of at least 1.2 m$^2$.

* * * * *